United States Patent [19]

Chism

[11] Patent Number: 4,860,332

[45] Date of Patent: Aug. 22, 1989

[54] APPARATUS FOR THE AUTOMATIC IN-CIRCUIT TESTING OF SUBSCRIBER LINE INTERFACE CIRCUITS AND METHOD THEREFOR

[75] Inventor: Wayne R. Chism, Greeley, Colo.

[73] Assignee: Hewlett-Packard Company, Palo Alto, Calif.

[21] Appl. No.: 221,062

[22] Filed: Jul. 19, 1988

[51] Int. Cl.[4] .......... H04M 1/24

[52] U.S. Cl. .......... 379/1; 379/27; 379/6

[58] Field of Search .......... 379/27, 2, 6, 1; 324/73 R, 73 AT, 73 PC

[56] References Cited

U.S. PATENT DOCUMENTS 4,577,072 3/1986 Lulay .......... 379/27

*Primary Examiner*—Stafford D. Schreyer

*Attorney, Agent, or Firm*—Jeffery B. Fromm

[57] ABSTRACT

An automated apparatus and method for in-circuit testing of a subscriber line interface circuit mounted on a telecommunications card. The automated apparatus is capable of testing the functioning of the subscriber line interface circuit: by applying analog voltage to the tip and ring pins and recording the resulting transmit signals, by applying at least one analog voltage signal to the receive pin and recording the resulting signals on the tip and ring pins, by applying onhook and offhock signals to the tip and ring pins and receiving the resulting hook status signal, and by applying a ring command to the ring control pin and recording the resulting ring signal and then applying an offhook signal to the tip and ring pins and receiving the resulting ring trip signal. In conducting these tests, the automated apparatus electrically overdrives any analog or digital signal from associated components on the circuitry.

12 Claims, 8 Drawing Sheets

APPARATUS FOR THE AUTOMATIC IN-CIRCUIT TESTING OF SUBSCRIBER LINE INTERFACE CIRCUITS AND METHOD THEREFOR

RELATED APPLICATIONS

This application is related to the following filed applications by the same inventor:

1. Programmatically Generated In-Circuit Test for General Purpose Operational Amplifiers, Ser. No. 175,831, Filed Mar. 31, 1988 now U.S. Pat. No. 4,797,627,
2. Programmatically Generated In-Circuit Test Of Analog to Digital Converters, Ser. No. 175,874, Filed Mar. 31, 1988; and
3. Programmatically Generated In-Circuit Test of Digital to Analog Converters, Ser. No. 175,713, Filed Mar. 31, 1988.
4. Apparatus for the Automatic In-Circuit Testing of Coder/Decoder Telecommunications Circuits and Method Therefor; inventor: Wayne R. Chism; Ser. No. 221,066, filed July 19, 1988.

FIELD OF THE INVENTION

This invention relates to the in-circuit functionality testing of hybrid circuit components, i.e., circuits having both analog and digital components and input/output ports; and, in particular, to an apparatus and method for the automatic in-circuit testing of subscriber line interface circuits.

STATE OF THE PROBLEM

A subscriber line interface circuit (SLIC) finds application in the telecommunications industry for interfacing analog instruments such as telephones, FSK Modems, fax machines and the like to telephone digital switching and transmission network equipment. SLIC perform multiple functions. For example, the SLIC is responsible for the direct interface between the telephone line and the low level signal processing components on a telecommunications line card. Both voice (audio in a range of 300 Hz to 3 KHz) and signalling information are processed by the SLIC. The SLIC performs the conventional BORSCHT functions i.e., Battery feed (power to the telephone), Overvoltage protection, Ringing, Supervision (on or off hook status), Hybrid (2 to 4 wire conversion), and Test.

With the deregulation of the phone industry, numerous SLIC circuit designs are available from a variety of manufacturers. SLICS are being manufactured in large volumes to accommodate customer requirements. All of these circuits vary in design and degree in the composition of the hybrid circuits found in the SLIC design. All SLICs, however, irregardless of the manufacturer, must perform according to strict telecommunication standards as defined at the input/output parts. The proliferation of these "hybrid" components, i.e., integrated circuits incorporating both analog and digital functions in their design, has rendered standard fault detection techniques obsolete, and has created manufacturing and quality control problems for printed circuit board assemblies utilizing these devices and circuits.

A SLIC circuit generally comprises a component of an overall telecommunications card. While the card may be functionally tested at the inputs and outputs of the card, an "in-circuit test" may be desirable as a means by which to identify specific SLIC problems independently of other circuitry on the card. The in-circuit test is thus a manufacturing diagnostic tool aimed at reducing the overall manufacturing cost of the card.

Under the teachings of the present invention, in-circuit tests or measurements refer to printed circuit board test procedures which, through the use of various isolation techniques, perform "pin checks" and "gross functionality tests" on an individual circuit regardless of the specific circuit configuration or the effects of the surrounding components. "Pin checks" are tests specifically designed to verify appropriate electrical activity on all device pins (i.e., the physical connections on the card to the specific SLIC circuit). "Gross functionality tests" are more comprehensive than pin checks and refer to tests designed to verify the basic function of the SLIC in addition to simply verifying pin activity. It is to be expressly understood that neither the pin check test or the gross functionality test provides for a full functionality test of the SLIC circuit specification.

It is a problem in the field of in-circuit functionality testing of hybrid SLIC circuits to automatically test the circuit when resident on a card and interconnected with associated components. In practice, neither conventional analog or digital discrete in-circuit test techniques, alone, will suffice as a means of performing a comprehensive in-circuit test of analog and digital hybrid SLICs. Hence, printed circuit board assemblies incorporating SLICs have been difficult to test. As a result, telecommunication cards may incorporate defective SLIC circuits which are detected only much later in the manufacturing process. To detect and correct such defective SLICs at this time is considerably more expensive and inconvenient.

Therefore, a need exists to provide a fully automated and high speed test apparatus capable of conducting pin checks and gross functionality tests on "in-circuit" SLICS.

SOLUTION TO THE PROBLEM

The above described problem is solved and a technical advance achieved in the field by the programmatically generated in-circuit test apparatus and method of the present invention for subscriber line interface circuits. The present invention is an automated apparatus and method for in-circuit testing of the subscriber line interface circuit mounted on a telecommunication card. The subscriber line interface circuit is interconnected with other associated components on the card. The subscriber line interface circuit conventionally has tip and ring pins, transmit and receive pins, and ring control, hook status, and ring trip pins.

The automated apparatus of the present invention connects to the tip, ring, and transmit pins, during a first test, for applying at least one analog AC voltage signal across the tip and ring pins and then recording the resulting transmit signal present on the transmit pin.

The apparatus then connects to the tip, ring, and receive pins for applying, during a second test, at least one analog AC voltage signal to the receive pin and then recording the resulting receive signals on the tip and ring pins. In order to apply the at least one analog AC voltage signal, the apparatus of the present invention must electrically overdrive any analog signal present on the receive pin when the telecommunication card is powered up.

The apparatus of the present invention then connects to the hook status, tip and ring pin for applying, during a third test, offhook and onhook signals to the tip and ring pins and receiving the resulting hook status signals on the hook status pin.

Finally, the apparatus of the present invention connects to the ring control, ring trip and the tip and ring pins for applying, during a fourth test, a ring command to the ring control pin. The apparatus of the present invention then records resulting ringing signal across the tip and ring pins and then applies an offhook signal to the tip and ring pins and receives the resulting ring trip signal on the ring trip pin.

The apparatus of the present invention for each of these tests receives the transmit, receive, hook status, ringing and ring trip signals and compares each signal to an expected signal. In the event that any received signal falls outside a predetermined range of the expected signal, a fail signal, for the SLIC, under test, is issued. Otherwise the SLIC passes and the apparatus of the present invention releases all relays and becomes ready for the next testing procedure.

DETAILED DESCRIPTION

Figure 1:
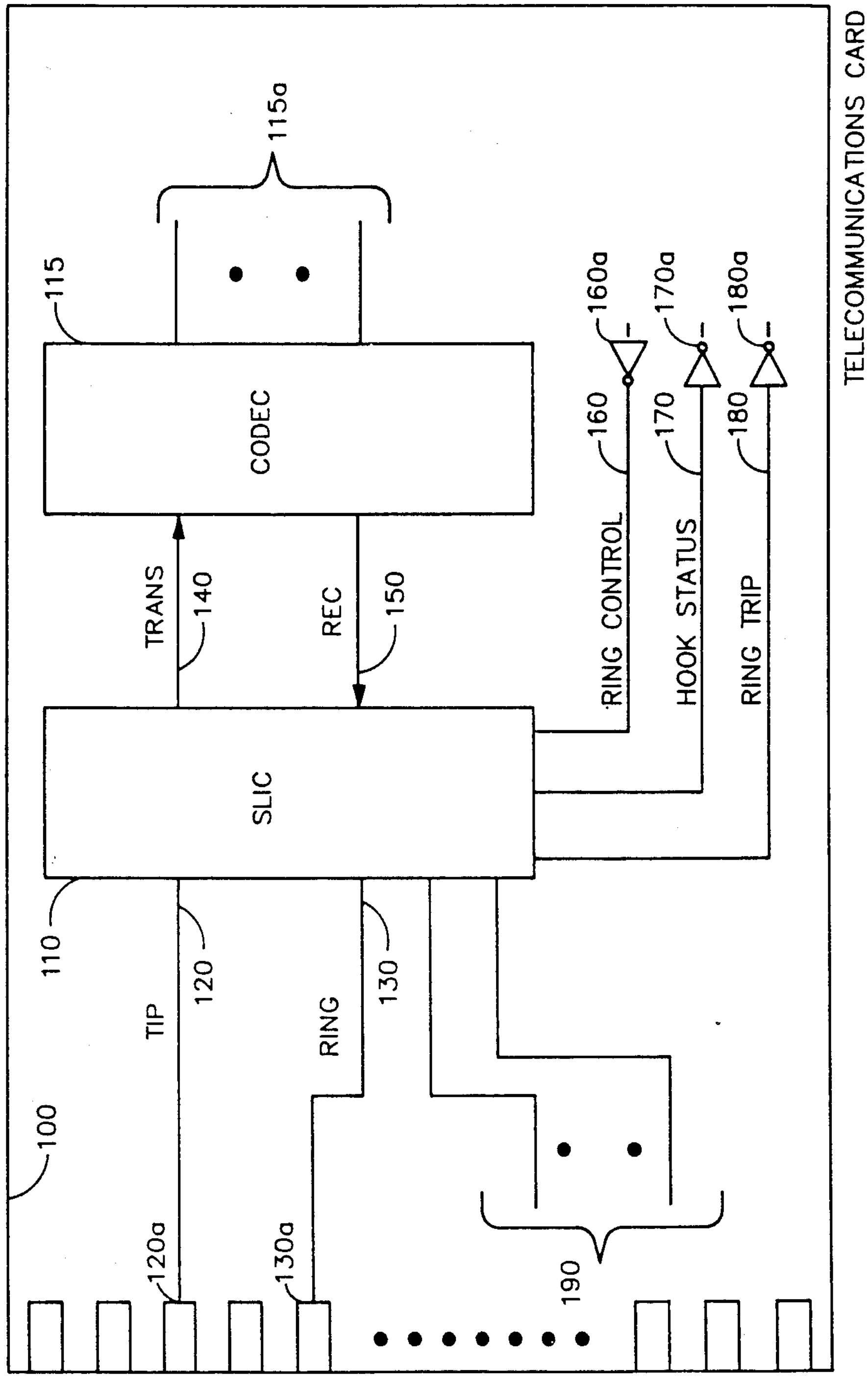
FIG. 1 is a block circuit diagram of a subscriber line interface circuit located on a conventional telecommunications card, FIGS. *2a* and *2b* are schematic circuit diagrams of the in-circuit tester of the present invention selectively interconnected to the subscriber line interface circuit being tested.

A typical telecommunications card 100 is shown in FIG. 1 which carries a SLIC 110 and other telephony components such as a CODEC 115. A CODEC is an acronym for COder-DECoder and refers to a class of integrated circuits used in the telecommunications industry. It is to be expressly understood that a conventional telecommunications card 100 may have a variety of other hybrid components located on the printed circuit board.

The SLIC 110 conventionally receives a tip 120 and ring 130 signal from a line or pin connection which is interconnected to the card such as inputs 120*a* and 130*a* to the card 100. The tip 120 and ring 130 are conventionally interconnected to a telecommunication device such as a telephone instrument, not shown. The SLIC 110 delivers an analog transmit signal to the CODEC 120 over line or pin 140. The CODEC 120 delivers an analog receive signal over line 150 to the SLIC 110. The CODEC is interconnected over lines 115a to other components on the telecommunications card 100 through, typically, a PCM backplane. The SLIC 110 also receives a ring control signal over line 160 from an associated component 160*a* also located on card 100. The SLIC, in turn, delivers a hook status signal on line 170 to an associated component 170*a* and a ring trip signal on line 180 to an associated component 180*a*. Finally, the SLIC receives power and ground over lines 190.

In FIGS. *2a* and *2b*, the configuration for the in-circuit testing of the SLIC 110, under the teachings of the present invention, is set forth. The telecommunications card 100 is placed on a fixture, not shown, wherein the in-circuit tester 200 of the present invention accesses the SLIC 110 input and output by means of mechanical test probes 210 that engages the actual pins. As shown in FIG. *2b*, the in-circuit tester 200 utilizes a computer 220 as an overall control of the present invention. The computer 220 can be actually located in the tester or it can be remote therefrom. Computer 220 over lines 222 control scanning relays 230 in a fashion to be described subsequently and over line 224 also operates relay 232. The computer also operates a relay multiplexer 223 over lines 221. The computer 220 also operates a waveform recorder 240 over lines 226, an AC source 250 over lines 228, and a bank of digital drivers and receivers 260 over lines 262. The computer 220 has an internal memory 220*a* for storing the program of the present invention as well as a memory portion 220*b* for storing "expected" signals from the SLIC 110 under test and a memory portion 220*c* for storing the "actual" signals resulting from the testing of the SLIC.

The waveform recorder 240 is selectively interconnected by a relay 223*a* over line 242 to a coupling transformer 234, by a relay 223*b* over line 244 to an attenuator 270 and by a relay 223c over line 246 to the transmit input to the SLIC on line 140. The AC source 250 is also connected to the coupling transformer 34 by a relay 223d over line 242 and is further interconnected by a relay 223*e* over line 252 to an analog overdrive amplifier 280. The overdrive amplifier 280 produces a minimum output current of 150 mA with a maximum output impedance of 3.0 ohms. The AC source 250 is an alternating current/voltage source having a range of +/−10 volts at a minimum resolution of 3.0 mV with an accuracy of +/−0.1% and a frequency range of 0.5 Hz to 20 KHz with a resolution of 0.5 Hz and an accuracy of +/−0.5%.

The output of the overdrive amplifier 280 is delivered over line 282 through relay 230*e*. The remaining input to the amplifier is delivered from relay 230*d* over line 284. The attenuator 270 is interconnected over line 272 to scanning relay 230*c* and over line 274 to scanning relay 230*b*. Likewise, relay 232 is connected to lines 272 and 274 as shown in FIG. *2b*. The digital driver 260*c* and receivers 260*a* and 260*b* are selectively interconnected over lines 266, 262, and 264, respectively. The overdriving digital driver 260*c* operates in a range of −3.5 to +5.0 DC volts at a minimum resolution of 5.0 mV and a current capability of +/−500 mA.

The in-circuit tester 200 communicates with the SLIC 110, under test, through the scanner relays 230 which are connected to mechanical probes 210 on a test fixture, not shown. The mechanical and electrical connections are shown in FIG. 2 with the probes engaging the selected pins of the SLIC 110, under test, and ready for the pin checks and gross functionality tests of the present invention as set forth in the following. The probes 210 physically make contact with the printed circuit pins, pads or points for the input and output lines of the SLIC 110. In this position, power can be selectively provided to the card.

It is to be expressly understood that to perform an in-circuit test with the telecommunications card 100 powered up, it becomes necessary to electrically isolate the SLIC 110, under test, from all surrounding circuitries. This cannot be physically done (i.e., separation of the components from the card) and must be electrically done, under the teachings of the present invention by means of guarding, digital overdriving and analog overdriving while preventing damage to the other associated components on the card. Once the SLIC 110 is isolated from all surrounding circuitries, the appropriate SLIC inputs are stimulated and then measurements are made at the appropriate SLIC outputs to determine pin checks and gross functionality. This process may be repeated as many times as necessary to completely evaluate the SLIC, under test.

The terms Tip and Ring date back to old patch panel telephone switchboards and refer to the physical tip and ring connection on patch board plugs. The tip 120 and ring 130 functions to form a floating bi-directional port for an interface to a telephone instrument, not shown. Since signals on the tip 120 and ring 130 float, the connection to the in-circuit tester 200 must be made through a transformer coupler. Tip 120 and ring 130 serve as both an input and an output port to the SLIC 110 and the SLIC 110 functions to convert the tip and ring bi-directional port into two uni-directional lines: transmit over line 140 and receive over line 150. The tip and ring lines are also involved in the voice channel path and in the multiple signaling function such as hook status on pin 170 and ring tip on pin 180 and ring detection.

Figure 2A:
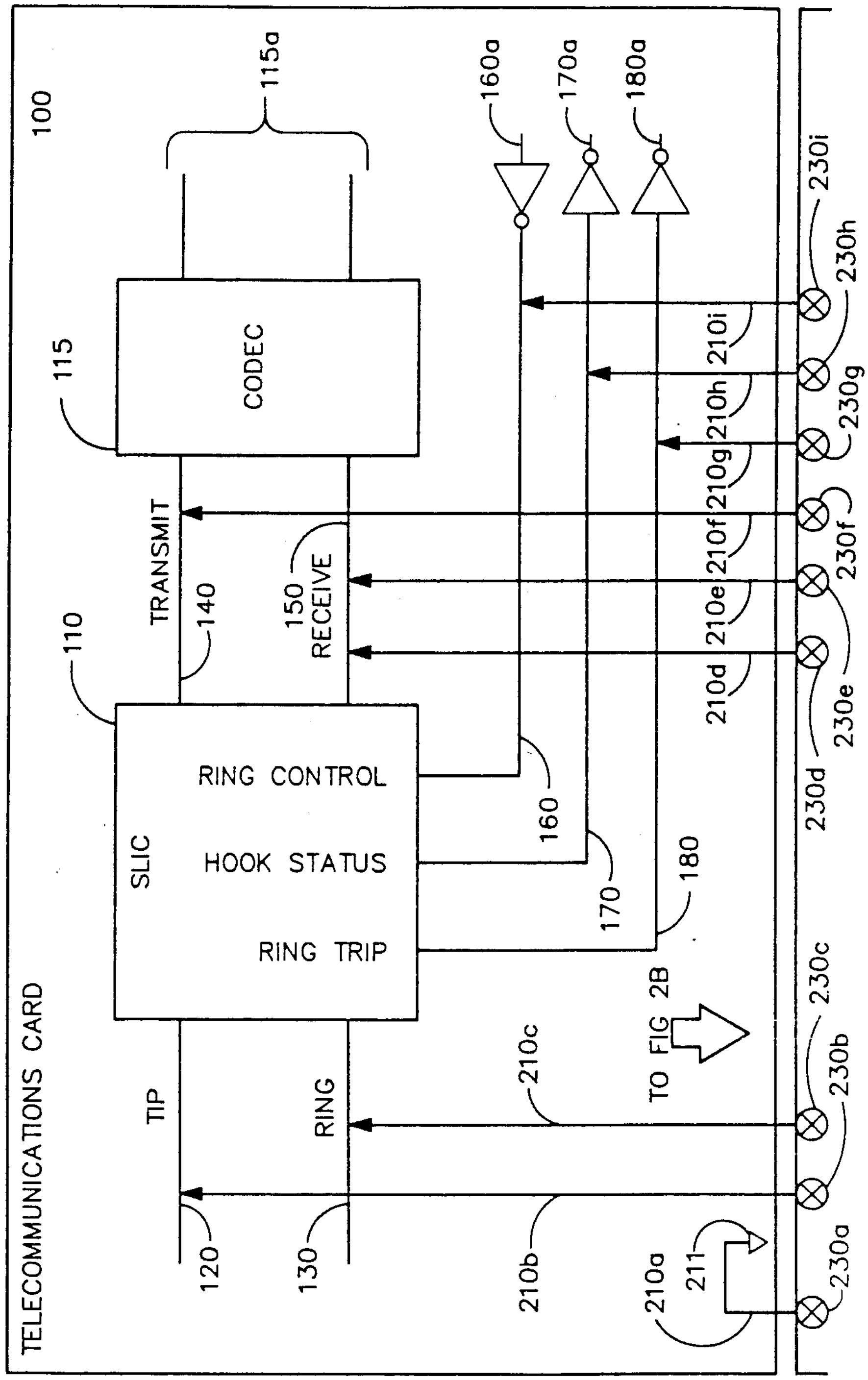
Figure 2B:
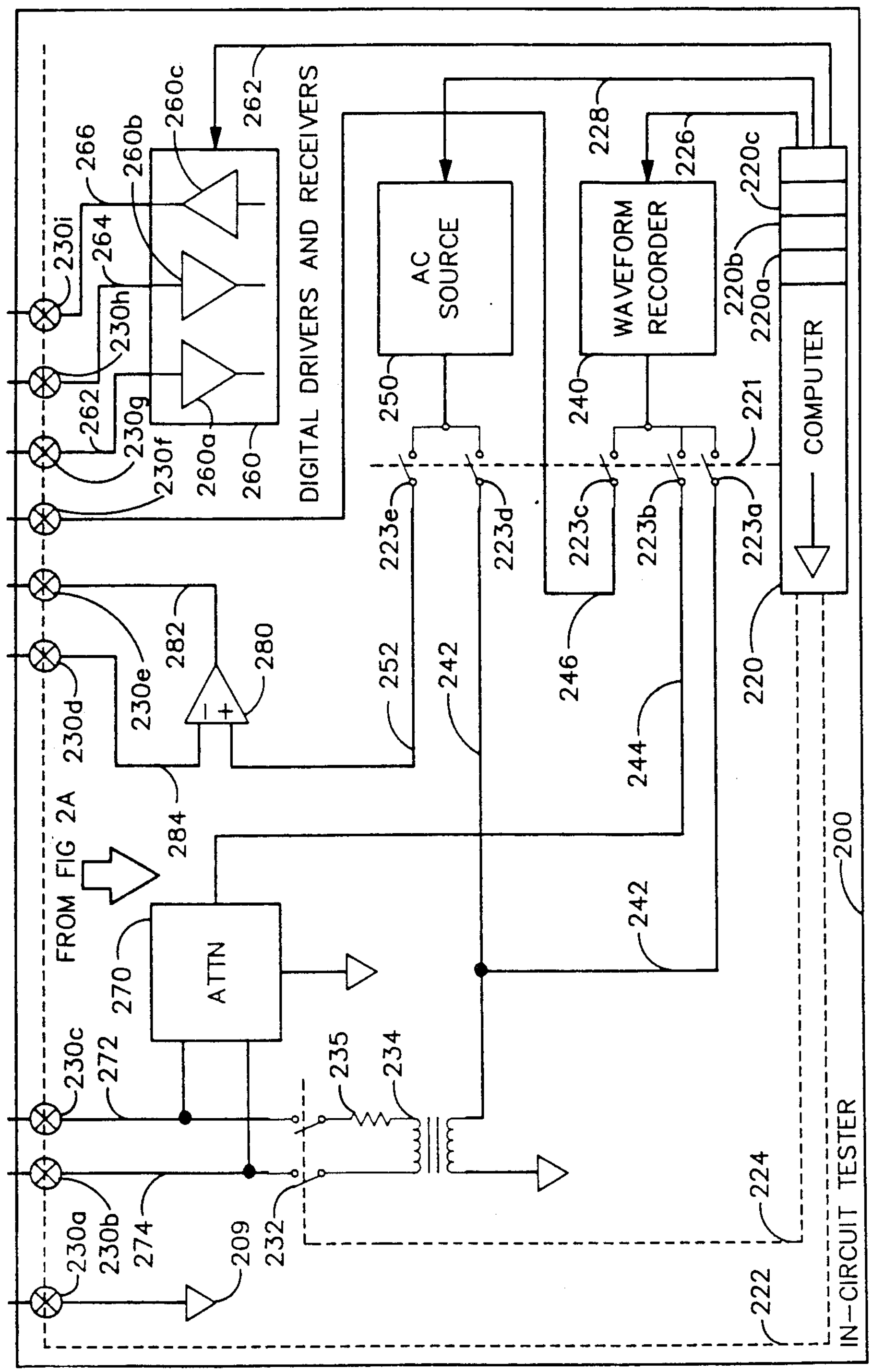
Figure 3:
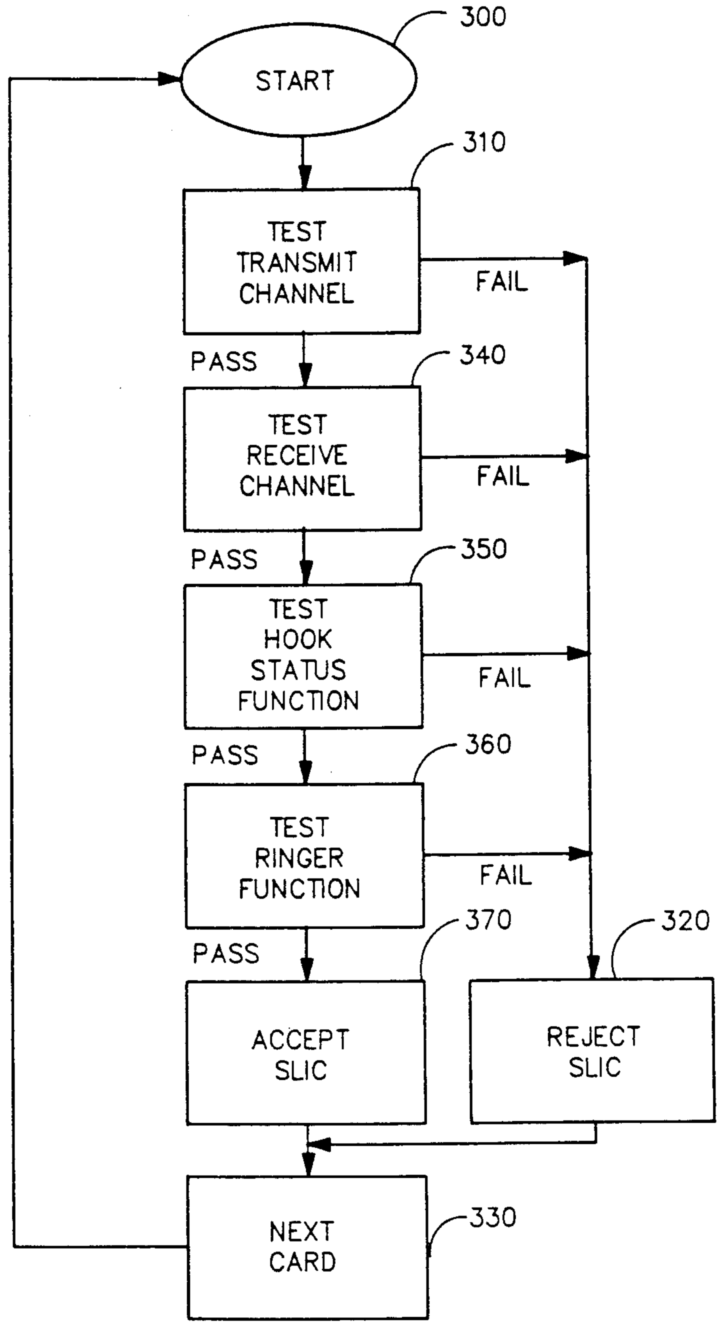
FIG. 3 is a generalized flow diagram setting forth the automated test modules of the present invention, FIG. 4 sets forth the flow diagram for the module testing the transmit channel on a subscriber line interface circuit, under test.

In FIG. 3 the overall automatic operation performing the tests of the present invention is set forth. The computer 220 is programmed in memory 220*a* to start 300 with a card containing a SLIC 110 on the fixture with the probes in place as shown in FIGS. 2*a* and 2*b*. The system is initially reset and the first test to be performed is the test of the transmit channel 310 and, if it fails, then the SLIC is rejected 320 and the next card 330 is accessed. Upon failure, the next telecommunications card 100 is selected and mounted onto the test fixture. If, on the other hand, the test of the transmit channel 310 passes, the testing of the receive channel 340 commences. The system then successively tests at different time intervals the status of the hook function 350 and the ringer function 360. If the SLIC 110 passes these four tests, (i.e., 310, 340, 350, and 360), the system accepts the SLIC 370, all probes 210 are then removed and the card 100 is released from the fixture. The next card 330 is then mounted and the testing continues.

It is to be expressly understood that the order of conducting these tests could be any suitable order based upon the needs of a particular customer. In addition, it is to be expressly understood that if any one of the tests fail, upon encountering the first failure, the testing procedure could stop without completing the remaining tests and the SLIC 110 under test, be rejected. On the other hand, it is to be expressly understood that in the reject SLIC stage 320, all four tests could be completed and those tests which fail could be separately recorded for use by the operator of the system. In addition, while a new card could be mounted at stage 330, the system could be programmed to conduct other in-circuit tests on other components on the same card before proceeding to the next card.

The advantage of the in-circuit tester 200 of the present invention is that it automatically and rapidly proceeds from test to test, checks the pins and verifies gross functionality as will be discussed in the following.

Figure 4:
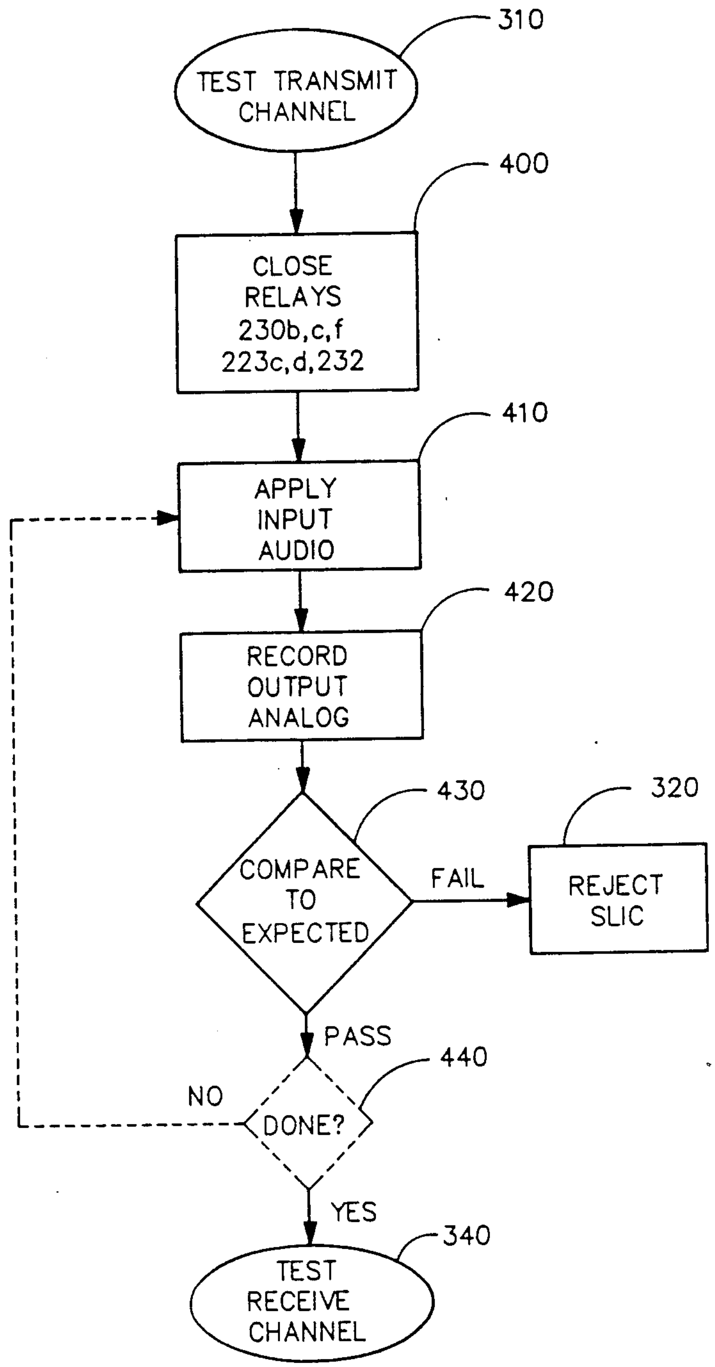

1. Test Transmit Channel 310—In FIG. 4, the automatic procedure for testing the transmit channel 140 during a first time interval of the SLIC 110 under test, is set forth.

The first stage 400 of this test is to close the appropriate relays. The computer 220 closes the scanner relays 230*b*, 230*c* and 230*f*. This connects the in-circuit tester 200 to probe 210*b* to the tip pin 120, probe 210*c* to the ring pin 130, and probe 210*f* to the transmit pin 140. Relay 232 is also closed to couple the ring and tip pins to the coupling transformer 234. The coupling transformer 234 electrically isolates the tester 20 from the SLIC to guard against damaging DC voltages associated with the floating tip-ring interface and is interconnected over line 242 through a closed relay 223*d* to the AC source 250. In this set up, the AC source 250 is directly connected across the tip and ring of the SLIC I10 under test. The output signal on the transmit pin 140 of the SLIC 110 is delivered over probe 210*f*, through relay 230*f*, and over line 246 through closed relay 223*c* into the waveform recorder 240. In addition, the ground 209 of the in-circuit tester 200 and the ground 211 of the telecommunications card 100 are connected by the closure of relay 230*a*. This is true for all of the tests herein and will not be repeated.

At this point in the operation, the SLIC 110 under test, can be driven by the AC source 250 at the tip and ring pins and the resulting transmit output signals at pin 140 can be recorded by waveform recorder 240. An audio signal 410 is applied to the SLIC 110 and the analog output on the transmit channel 140 is recorded 420 by the waveform recorder 240. The computer 220 then compares 430 the recorded output signal which is stored in memory 220*c* with an expected signal stored in memory 220*b* and if the recorded signal favorably compares to the standard signal, the computer opens the relays and proceeds to the test receive channel mode 340 and if the comparison is unfavorable, the computer rejects 320 the SLIC. For example, the AC source 250 could apply a 3 volt, peak-to-peak, 2 KHz sine wave to the Tip and Ring pins 120 and 130. The resulting waveform on the Transmit pin, as recorded in recorder 240 would pass if it is within a +/−10% range of the expected 3 volt, peak-to-peak, 2 KHz signal. If the actual waveform is outside the 10% window, the SLIC fails.

It is to be expressly understood that more than one audio test 410 as indicated by stage 440 could be conducted. For example, a range of audio tests in the range of 300 Hz to 3 KHz could be conducted on the SLIC 110 or, simply, a single discrete audio test. In addition, it is to be expressly understood that the same test could be reported more than once. It is also understood that suitable time delays are present between stages 400, 410, 420, and 430 to allow the in-circuit tester 200 and the SLIC 110 to settle down and respond to the signals. For example, when the input audio signal 410 is applied to the tip 120 and ring 130, a time delay is required to allow the SLIC 110 to process the audio signal and deliver it to the transmit channel 140.

2. Test Receive Channel 340—The next automatic in-circuit test of the present invention is the test of the receive channel 340 during a second time interval as set forth in FIG. 5. Unlike the test of the transmit channel 140, the test of the receive channel 150 requires electrical isolation of the SLIC 110 from the associated CODEC 120. How this is accomplished will be explained in the following.

Figure 5:
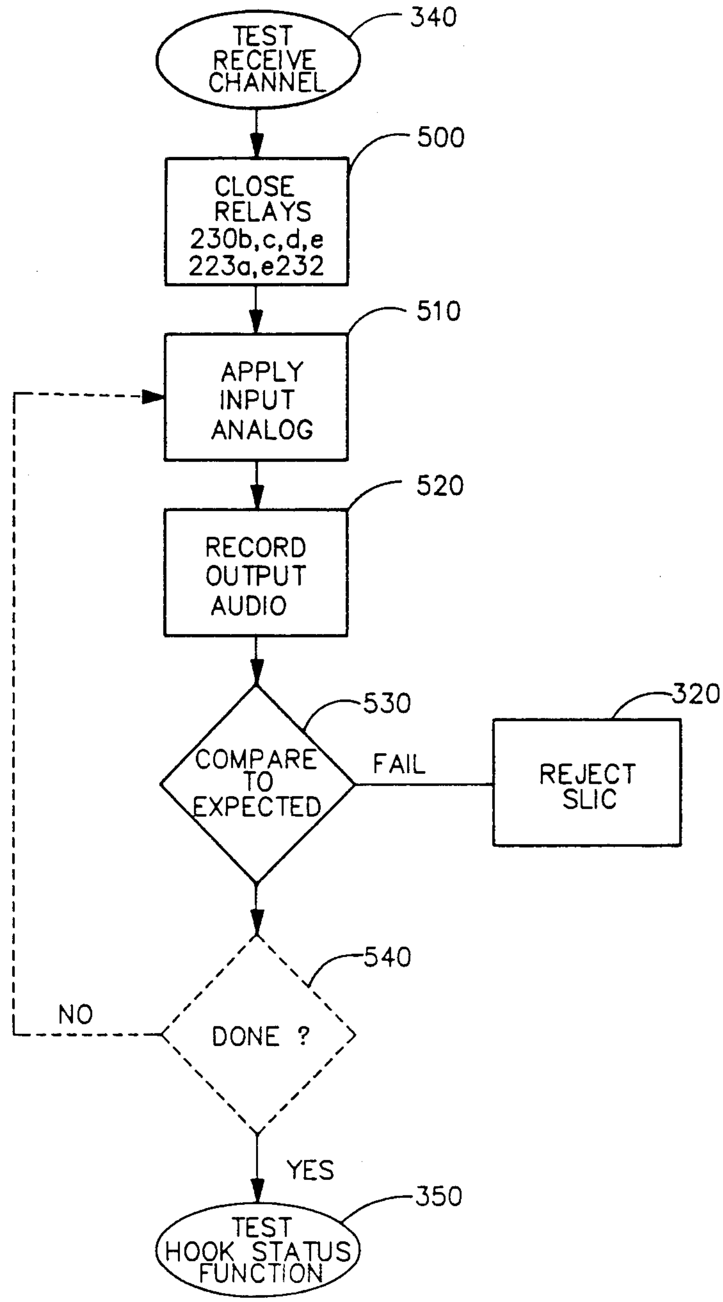
FIG. 5 is a flow diagram for the module testing the receive channel on a subscriber line interface channel, under test.

As shown in FIG. 5, the computer 220 closes relays 230*b*, 230*c*, 230*d*, and 230*e*, closes relays 223*a* and 223*e* and closes relay 232. The closing of these relays causes the receive pin 150 to be connected to the analog overdrive amplifier 280 which in turn is connected to the AC source 250. In addition, the tip 120 and ring 130 are connected to the coupling transformer 234, the output of which is connected over line 242 to the waveform recorder 240. After the connection has been made, the computer 220 applies an appropriate input analog signal 510 to stimulate the receive pin 150 of the SLIC 110.

The AC source 250 delivers the analog signal over line 252 to the overdrive amplifier 280. The overdrive amplifier 280 maintains the voltage by providing sufficient current to overdrive any signal on line 150 from the CODEC 120. The overdrive amplifier 280 thus imposes the waveform as determined by the AC source 250 directly onto the receive pin 150. The amplifier 280 receives its negative input on line 284 from receive pin 150. This provides remote sensing which reduces errors in providing the desired waveform to the SLIC 110 under test. The remote sensing and guarding assures the accuracy of the applied and detected voltages and effectively cancels out level shifts.

After a reasonable delay time frame to allow the SLIC 110 to process the input signal, the waveform recorder 240 records 520 the output on the tip 120 and ring 130 as transmitted through the coupling transformer 234. The computer then compares the recorded signal with an expected signal at stage 530 and if it fails, rejects 320 the SLIC. If it passes the comparison 530, the computer 220 can optionally 540 determine whether or not other input analog signals either in a range or the same signal should be applied 510 to repeat the above described process. When done, the computer 220 opens the relays and accesses the next test, the test of the hook status function 350.

For example, if the AC source 250 applies a 3 volt, peak-to-peak, 2 KHz sine wave to the receive pin 150 of the SLIC 110, under test, the resulting waveform from the tip and ring pins is recorded through the 1:1 isolation transformer 234. The recorder waveform is compared to the expected signal of 3 volts, peak-to-peak, 2 KHz sine wave +/−10%. If the results fall outside the 10% window the SLIC fails.

Figure 6:
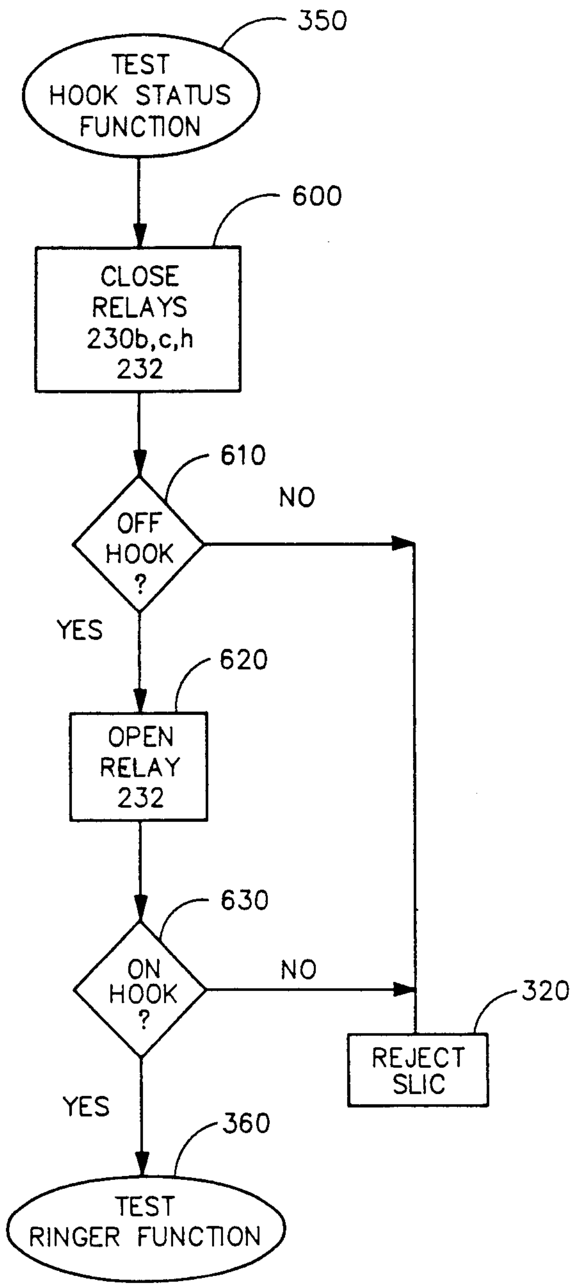
FIG. 6 is a flow diagram for the module testing the hook status function of a subscriber line interface circuit, under test.

3. Hook Status Function Test 350—In FIG. 6, the procedure the computer 220 follows for conducting the test of the hook status function 350 during a third time interval is set forth. This is a two part test.

During the first part of the test, the computer 220 over line 222 closes standard relays 230*b*, 230*c*, and 230*h* as well as relay 232. This occurs in stage 600. In this circuit arrangement, the coupling transformer 234 and a 400 ohm resistor 235 are interconnected across the tip 120 and ring 130 input to the SLIC 110. This creates an "offhook" condition. After a suitable delay, necessary for the SLIC 110 to respond, the hook status output on pin 170 is delivered over mechanical probe 210*h* through closed relay 230*h* to a digital receiver 260*b*. If the SLIC circuit 110 is working properly, the digital receiver 260*b* will detect an "offhook" signal. This occurs in stage 610 and, if it does not, the processor will reject the SLIC in stage 320. The resistor 235 is a 400 ohm resistor which is in series with the transformer and serves to set the DC current level flowing between the tip 120 and the ring 130 input to the SLIC 110, an indication of "off-hook" status.

If the computer 220 successfully determines an "off-hook" status as being proper, the second part commences. Stage 620 is entered and relay 232 is opened thereby disconnecting the coupling transformer 234 and the resistor 235. This emulates an "onhook" status at the tip and ring input. After a suitable delay at stage 630, the processor 220 ascertains whether the appropriate on-hook signal was received. If not, the SLIC 110 is rejected and if yes, the computer opens the relays and the process continues with the test ringer function 360.

Figure 7:
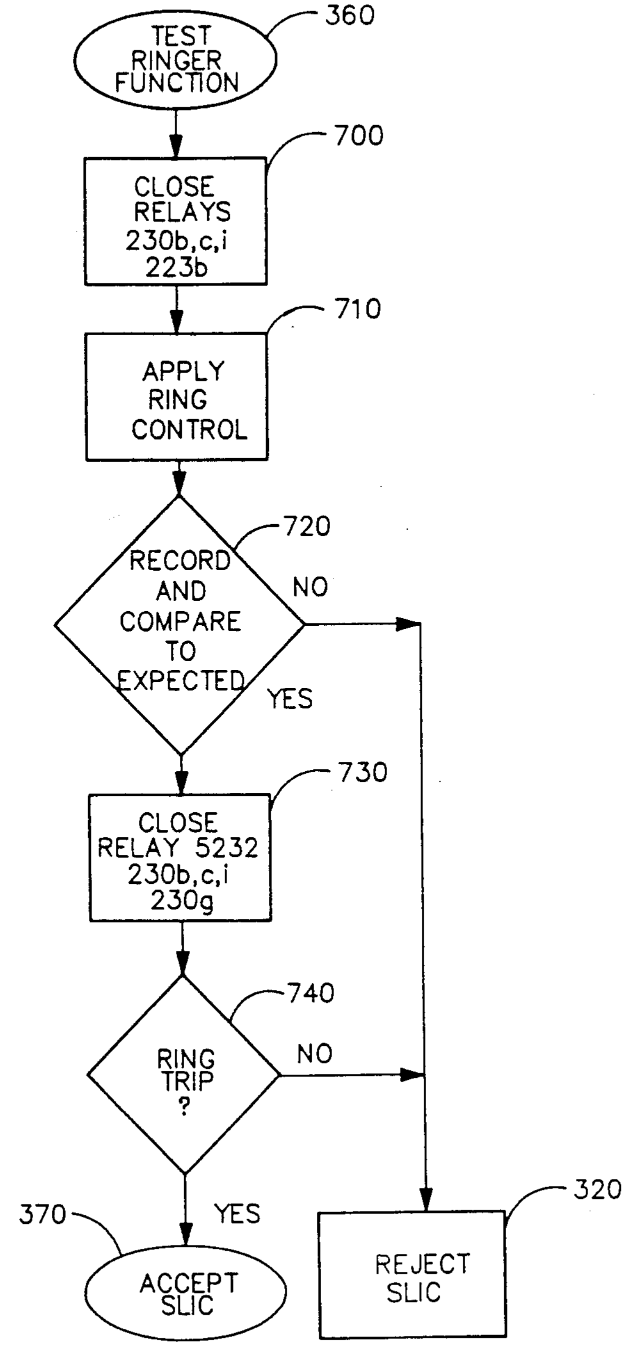
FIG. 7 is the flow diagram for the module testing the ringer function of a subscriber line interface circuit, under test.

4. Test Ringer Function 360—In FIG. 7, the process for testing the ring function during a fourth time interval is set forth and also comprises two parts.

In the first part, the computer 220, at stage 700, closes relays 230*b*, 230*c*, and 23O*i* as well as relay 223*b*. This interconnects the tip and ring pins of the SLIC 110 to the attenuator circuit 270. The output of the attenuator circuit 270 is delivered over line 244 through relay 223*b* to the waveform recorder 240. At the same time, the output of the digital driver 260*c* is delivered over line 266 through closed relay 230*i* through mechanical probe 210*i* and to ring control pin 160.

The computer then, at stage 710, applies current by activating driver 260*c* to drive the ring control pin 160. The stimulation of the ring control input 160 by the driver 260*c* simulates a ring command to the SLIC. To accomplish this, the digital input on line 160 must be isolated from the associated component 160*a* and is stimulated by means of a high current digital overdriving driver 260*c*. The application of this overdriving signal permits the SLIC to operate independently of the other digital circuitry on the board 100 during the test. If the digital overdrive testing is conducted for too long of a time, damage to the upstream component 160*a* could occur. The present invention completes this basic task rapidly and the current levels are designed to be well within the overdrive values of the upstream integrated circuit components.

Upon assertion of the ring control on pin 160, the SLIC 110 after a suitable delay, produces ring voltage at the tip and ring. This is delivered into the attenuator 270. The attenuator is necessary to guard the tester 200 as the ring voltage is high, typically 90–150 volts AC, and outside of the range of the waveform recorder 240. The attenuator is essentially a network of resistors dropping the voltage down by a factor of ten. This attenuator voltage is then delivered over line 244 into the waveform recorder 240 and the computer 220 then compares it to an expected value in stage 720. If improper, the SLIC 110 is rejected and if proper, the second part of operation is entered.

In stage 730, the second part of operation is entered, and that is the detection of a "ring trip". Ring trip occurs when a ringing phone is taken off hook and this is simulated by the processor closing relays 232 and 230*g*. The closing of relays 232 applies the coupling transformer 234 with the resistor 235 across the tip and ring line thereby simulating an offhook condition. After a suitable time delay the computer in stage 740 senses the status of the ring trip pin 180 over mechanical probe 210*g* through relay 230*g* and into a digital receiver 260*a*. If no ring trip is detected, the SLIC is rejected and if ring trip is detected, the computer 220 accepts the SLIC and returns to the next card 330 stage in FIG. 3.

This completes the automated SLIC testing procedure of the present invention. In the typical testing of a SLIC, the present invention proceeds automatically and provides several orders of magnitude of speed improvement over conventional SLIC testing approaches. After completion, the computer opens all relays. The card can now be removed and the next SLIC inserted for testing or the system can proceed with tests of other components on the same card as set forth in the above related applications.

It is to be expressly understood that while a preferred order of testing is set forth in FIGS. 3–7, these procedures may be changed in the order of processing, truncated into fewer steps in order to increase throughput or further partitioned into more steps in order to cover a specific requirement.

The present invention provides a unique means and method of programmatically generating in-circuit pin checks and gross functionality tests of subscriber line interface circuits such as those found on a telecommunications card. The present invention, therefore, provides a method of quality control in the manufacture of printed circuit boards containing these hybrid devices.

The foregoing description of the invention has been presented for purposes of illustration and description. It is not intended to be exhaustive or to limit the invention to precisely the form disclosed, as other modifications and variations may be possible in light of the above teachings. The embodiment was chosen and described in order to best explain the principles of the invention in its practical application to thereby enable others skilled in the art to best utilize the invention and various embodiments and various modifications as are suited to the particular use contemplated. It is intended that the appended claims be construed to include other alternate embodiments of the invention except as limited by the prior art.

I claim:

1. An automated apparatus for in-circuit testing of a subscriber line interface circuit mounted on a telecommunications card, said subscriber line interface circuit being interconnected with other associated components on said card, said subscriber line interface circuit being capable of generating transmit, telecommunication, hook status, ringing and ring trip signals, said automated apparatus comprising:

means connected to said telecommunications card for electrically isolating said subscriber line interface circuit from said other associated components on said card, means connected to said electrical isolation means for selectively causing said subscriber line interface circuit to generate said transmit, telecommunication, hook status, ringing and ring trip signals by applying test signals to said subscriber line interface circuit which overdrive any analog or digital signals present on said telecommunications card, means in said selective causing means for comparing each selectively generated transmit, telecommunication, hook status, ringing and ring trip signals to expected values, and means in said selective causing means for issuing a fail signal when any one of said selectively generated signals does not correspond to said expected value.

2. An automated apparatus for in-circuit testing of a subscriber line interface circuit mounted on a telecommunications card, said subscriber line interface circuit being interconnected with other associated components on said card, said subscriber line interface circuit having tip and ring pins, transmit and receive pins, and ring control, hook status and ring trip pins, said automated apparatus comprising:

first means automatically connecting to said tip, ring, and transmit pins for applying, during a first time interval, at least one analog AC voltage signal across said tip and ring pins, said first applying means further recording transmit signals on said transmit pin, second means automatically connecting to said tip, ring and receive pins for applying, during a second time interval, at least one analog AC voltage signal to said receive pin, said second applying means further recording telecommunication signals on said tip and ring pins, third means automatically connecting to said hook status, tip and ring pins for applying, during a third time interval, off-hook and on-hook signals to said tip and ring pins, said third applying means receiving hook status signals on said hook status pin, fourth means automatically connecting to said ring control, ring trip, and tip and ring pins for applying, during a fourth time interval, a ring command to said ring control pin, said fourth applying means recording the ringing signal across said tip and ring pins, said fourth applying means then applying an off-hook signal onto said tip and ring pins and receiving the ring trip signal on the ring trip pin, and means receptive of said transmit, telecommunication, hook status, ringing and ring trip signals for comparing each of said received signals to expected signals, said comparing means issuing fail signals when any one of said received signals falls outside a predetermined range of said expected signals.

3. The automated apparatus of claim 2 further comprising means in said first and second applying means for generating said analog AC voltage signal, said generating means being capable of generating an AC voltage in the range of +/−10.0 volts at a minimum resolution of 3.0 mV with an accuracy of +/−0.1% and in a frequency range of 0.5 Hz to 20 KHz with a resolution of 0.5 Hz and an accuracy of +/−0.5%.

4. An automated apparatus for in-circuit testing of a subscriber line interface circuit mounted on a telecommunications card, said subscriber line interface circuit being interconnected with other associated components on said card, said subscriber line interface circuit having tip and ring pins, transmit and receive pins, and ring control, hook status and ring trip pins, said apparatus comprising:

first means automatically connecting to said tip, ring, and transmit pins for applying, during a first time interval, at least one analog AC voltage signal across said tip and ring pins, said first applying means further recording transmit signals on said transmit pin, second means automatically connecting to said tip, ring and receive pins for applying, during a second time interval, at least one analog AC voltage signal to said receive pin by electrically overdriving any analog signal on said receive pin, said second applying means further recording telecommunication signals on said tip and ring pins, third means automatically connecting to said hook status, tip and ring pins for applying, during a third time interval, off-hook and on-hook signals to said tip and ring pins, said third applying means receiving hook status signals on said hook status pin, fourth means connected to said ring control, ring trip, and tip and ring pins for applying, during a fourth time interval, a ring command to said ring control pin by electrically overdriving any digital signal on said ring control pin, said fourth applying means recording the ringing signal across said tip and ring pins, said fourth applying means then applying an off-hook signal onto said tip and ring pins and receiving the ring trip signal on the ring trip pin, and means receptive of said transmit, telecommunication, hook status, ringing and ring trip signals for comparing each of said received signals to expected signals, said comparing means issuing fail signals when any one of said received signals falls outside a predetermined range of said expected signals.

5. The automated apparatus of claim 4 further comprising means in said first and second applying means for generating said analog AC voltage signal, said generating means being capable of generating an AC voltage in the range of +/−10.0 volts at a minimum resolution of 3.0 mV with an accuracy of +/−0.1% and in a frequency range of 0.5 Hz to 20 KHz with a resolution of 0.5 Hz and an accuracy of +/−0.5%.

6. The automated apparatus of claim 4 further comprising means in said second applying means and receptive of said at least one analog AC voltage signal for amplifying said analog AC voltage signal in order to electrically overdrive said analog AC voltage signal.

7. The automated apparatus of claim 6 wherein said amplifying means produces a minimum output current of 150 mA within a maximum output impedance of 3.0 ohms.

8. The automated apparatus of claim 4 further comprising means in said fourth applying means receptive of said ring command for digital overdriving said ring command on said ring control pin.

9. The automated apparatus of claim 8 wherein said digital overdriving means operates in a range of −3.5 to 5.0 volts at a minimum resolution of 5.0 mV and a current capability of +/−500 mA.

10. A method for in-circuit testing of a subscriber line interface circuit mounted on a telecommunications card, said subscriber line interface circuit being interconnected with other associated components on said card, said subscriber line interface circuit being capable of generating transmit, telecommunication, hook status, ringing and ring trip signals, said method comprising the steps of:

electrically isolating the powered up subscriber line interface circuit from said other associated components on said card, selectively causing the subscriber line interface circuit to generate the transmit, telecommunication, hook status, ringing and ring trip signals by applying testing signals to the subscriber line interface circuit which overdrive any analog or digital signals present on said telecommunications card, comparing each selectively generated transmit, telecommunication, hook status, ringing and ring trip signals to expected values, and issuing a fail signal when any one of the selectively generated signals does not correspond to said expected value.

11. A method for in-circuit testing of a subscriber line interface circuit mounted on a telecommunications card, said subscriber line interface circuit being interconnected with other associated components on said card, said subscriber line interface circuit having tip and ring pins, transmit and receive pins, and ring control, hook status and ring trip pins, said method comprising the steps of:

during a first time interval:

(a) applying at least one analog AC voltage signal across said tip and ring pins, and (b) recording the resulting transmit signals on said transmit pin, during a second time interval:

(a) applying at least one analog AC voltage signal to said receive pin, and (b) recording the resulting telecommunication signals on said tip and ring pins, during a third time interval:

(a) applying off-hook and on-hook signals to said tip and ring pins, and (b) receiving the resulting hook status signals on said hook status pin, during a fourth time interval:

(a) applying a ring command to said ring control pin, (b) recording the resulting ringing signal across said tip and ring pins, (c) applying an off-hook signal onto said tip and ring pins, and (d) receiving the resulting ring trip signal on the ring trip pin, comparing each of the transmit, telecommunication, hook status, ringing and ring trip signals to expected signals, and issuing fail signals when any one of the received signals falls outside a predetermined range of said expected signals.

12. A method for in-circuit testing of a subscriber line interface circuit mounted on a telecommunications card, said subscriber line interface circuit being interconnected with other associated components on said card, said subscriber line interface circuit having tip and ring pins, transmit and receive pins, and ring control, hook status and ring trip pins, said method comprising the steps of:

during a first time interval:

(a) applying at least one analog AC voltage signal across said tip and ring pins, and (b) recording the resulting transmit signals on said transmit pin, during a second time interval:

(a) applying at least one analog AC voltage signal to electrically overdrive any analog signal on said receive pin, and (b) recording the resulting telecommunication signals on said tip and ring pins, during a third time interval:

(a) applying off-hook and on-hook signals to said tip and ring pins, and (b) receiving the resulting hook status signals on said hook status pin, during a fourth time interval:

(a) applying a ring command to electrically overdrive any digital signal on said ring control pin, (b) recording the resulting ringing signal across said tip and ring pins, (c) applying an off-hook signal onto said tip and ring pins, and (d) receiving the resulting ring trip signal on the ring trip pin, comparing each of the transmit, telecommunication, hook status, ringing and ring trip signals to expected signals, and issuing fail signals when any one of the received signals falls outside a predetermined range of said expected signals.

* * * * *

UNITED STATES PATENT AND TRADEMARK OFFICE

CERTIFICATE OF CORRECTION

PATENT NO. : 4,860,332

DATED : August 22, 1989

INVENTOR(S) : Wayne R. Chism

It is certified that error appears in the above-identified patent and that said Letters Patent is hereby corrected as shown below:

Column 5, line 10, "SLIC ]10" should be -- SLIC 110 --;

Column 6, line 21, "I]0" should be -- 110 under --.

Signed and Sealed this

Fourteenth Day of August, 1990

*Attest:*

HARRY F. MANBECK, JR.

*Attesting Officer* *Commissioner of Patents and Trademarks*